(12) United States Patent
Katoh

(10) Patent No.: US 6,578,832 B2
(45) Date of Patent: Jun. 17, 2003

(54) AIR DAMPER USED IN GLOVE BOX OF AUTOMOBILE

(75) Inventor: Kouichi Katoh, Kanagawa-ken (JP)

(73) Assignee: Piolax, Inc., Kanagawa-ken (JP)

( * ) Notice: Subject to any disclaimer, the term of this patent is extended or adjusted under 35 U.S.C. 154(b) by 2 days.

(21) Appl. No.: 09/934,958

(22) Filed: Aug. 22, 2001

(65) Prior Publication Data

US 2002/0043437 A1 Apr. 18, 2002

(30) Foreign Application Priority Data

Aug. 25, 2000 (JP) ...................... P2000-255858

(51) Int. Cl.[7] .............. F16F 9/02; F16F 9/32; F16F 9/36
(52) U.S. Cl. ............ 267/64.11; 16/66; 16/84; 188/322.22; 188/322.19; 188/322.16; 267/124; 267/113; 91/169.1
(58) Field of Search ............. 188/297, 322.19, 188/322.22, 129, 381, 322.16, 322.17, 322.13, 301, 266, 300, 322.18, 288; 267/120, 113, 64.11, 64.12, 124; 16/66, 84; 92/171.1, 169.1; 403/372

(56) References Cited

U.S. PATENT DOCUMENTS

| | | | | |
|---|---|---|---|---|
| 4,629,167 A | * | 12/1986 | Kimura et al. ............. | 16/66 |
| 5,104,098 A | * | 4/1992 | Kaneko .................. | 267/64.11 |
| 5,165,324 A | * | 11/1992 | Maruoka ................. | 92/171.1 |
| 5,697,477 A | * | 12/1997 | Hiramoto et al. ......... | 188/322.18 |
| 6,062,352 A | * | 5/2000 | Shinozaki et al. ......... | 267/120 |
| 6,119,832 A | * | 9/2000 | Hofmann ................ | 16/66 |
| 6,220,583 B1 | * | 4/2001 | Ito | |
| 6,367,785 B1 | * | 4/2002 | Nakabayashi et al. | |
| 6,442,796 B2 | * | 9/2002 | Arisaka et al. | |
| 6,460,839 B2 | * | 10/2002 | Müller | |
| 6,497,602 B2 | * | 12/2002 | Kroigaard | |

FOREIGN PATENT DOCUMENTS

| | | | |
|---|---|---|---|
| JP | 2000065116 | | 3/2000 |
| JP | 170816 | * | 6/2000 |

* cited by examiner

Primary Examiner—Douglas C. Butler
(74) Attorney, Agent, or Firm—Howard & Howard

(57) ABSTRACT

An air damper comprises a cylinder having first and second openings at both ends, a piston that moves in the cylinder, a piston rod coupled to the piston and moving in and out at the first opening of the cylinder; and a cap positioned at the second opening of the cylinder. The piston rod has a continuous outer wall and an opening extending along the longitudinal axis of the rod. The cross-sectional view of the piston rod taken along a plane perpendicular to the longitudinal axis is an inverse U-shape, an inverse V-shape, a C-shape, or the like. The piston rod has a fixing ring at the leading end. A plane containing the opening is perpendicular to a plane defined by the fixing ring. The piston rod is fixed to a glove box so that the opening faces down.

13 Claims, 10 Drawing Sheets

AIR DAMPER USED IN GLOVE BOX OF AUTOMOBILE

BACKGROUND OF THE INVENTION

1. Field of the Invention

The present invention generally relates to an air damper, and more specifically, to an improved structure of a cylindrical air damper installed in, for example, the glove box of an automobile, which can efficiently prevents dust from entering the cylinder.

2. Description of the Related Art

A cylindrical air damper of the earlier technology is disclosed in, for example, Japanese Patent Application Laid-open No. 2000-65116. This type of air damper includes a cylinder having openings at both ends, and a piston movable in the cylinder while keeping tight contact with the inner face of the cylinder. A piston rod that has a cross-shaped cross sectional view is coupled to the piston. The piston rod extends through the opening of one end of the cylinder. A cap is provided to the other end of the cylinder so as to be slightly movable in response to a pressure change in the cylinder. A fin-like fixing piece extends from the outer surface of the cylinder near the other end. An annular shelf (or platform) is formed in the inner surface of the cylinder near the other end. This annular shelf becomes a sealing face that comes into contact with the cap.

When using the conventional air damper in the glove box of an automobile, the other end of the cylinder is fixed to the instrument panel of the automobile via the fixing piece in a pivotable manner. The piston rod is fixed to the glove box. When the glove box is opened, the piston rod is pulled out of the cylinder via the opening, while causing the piston move along the cylinder. The pressure change in the cylinder causes the cap to come into tight contact with the sealing platform. In this state, the air flow is only allowed via the orifices formed in the base of the cap, which produces a damper effect and allows the glove box to open gently.

When closing the glove box, the piston rod is inserted slowly into the cylinder, and the piston moves in the same direction. The motion of the piston causes a pressure change in the cylinder, and due to the pressure change, the cap separates from the sealing platform (or the sealing face). Consequently, the air flows out of the cylinder, and the piston can move smoothly in the cylinder. This allows the glove box to be closed promptly.

Although the conventional air damper realizes a simple one-way air damper that makes use of a pressure change to cause the cap to engage with and disengage from the sealing platform, dust is easily accumulated in the space defined by the cross-shaped piston rod. The dust accumulated in the piston rod is likely to enter the cylinder during the operation of the piston. Once the dust enters the cylinder, the friction between the piston and the cylinder increases, and the interface between the cylinder and the piston is damaged or worn out.

SUMMARY OF THE INVENTION

The present invention is conceived to overcome these problems in the air damper of the earlier technology.

In one embodiment, the air damper comprises a cylinder having a first opening and a second opening, a piston that moves in the cylinder, a piston rod coupled to the piston and moving in and out at the first opening of the cylinder, and a cap positioned at the second opening of the cylinder. The piston rod has a continuous outer wall and an opening extending along the longitudinal axis of the rod. The cap has an orifice and a sealing flange.

The piston rod has an inverse U-shaped cross-section taken along a plane perpendicular to the longitudinal axis of the rod. Alternatively, the cross-sectional view of the piston rod may be an inverse V-shape, C-shape, or the like. The piston rod may take any shape as long as it has a continuous outer wall and an opening.

The piston rod has a fixing ring at a leading end. A plane containing the opening of the piston rod is perpendicular to a plane defined by the fixing ring. Alternatively, the plane containing the opening of the piston rod can be parallel to the plane defined by the fixing ring.

In another aspect of the invention, an air damper used to control a motion of a movable body relative to a fixed body is provided. This air damper comprises a cylinder having a first opening and a second opening, a piston that moves in the cylinder, a piston rod coupled to the piston and having a continuous outer wall and an opening extending along the longitudinal axis of the rod, the piston rod being fixed to either the movable body or the fixed body with the opening facing downward. A cap having an orifice and a sealing flange is positioned at the second opening of the cylinder.

In still another aspect of the invention, an air damper used to control a motion of a movable body relative to a fixed body comprises a cylinder having a first opening and a second opening, a piston that moves in the cylinder, a piston rod coupled to the piston and having a continuous outer wall and an opening extending along the longitudinal axis of the rod, piston rod being fixed to the movable body so that the opening faces the movable body.

In still another aspect of the invention, an air damper used to control a motion of a movable body relative to a fixed body comprises a cylinder having a first opening and a second opening, a piston that moves in the cylinder, a piston rod coupled to the piston and having a continuous outer wall and an opening extending along the longitudinal axis of the rod, the piston rod being fixed to the fixed body so that the opening faces the fixed body.

BRIEF DESCRIPTION OF THE DRAWINGS

Other objects, features, and advantages of the invention will be apparent from the following detailed description in conjunction with the attached drawings, in which.

DETAILED DESCRIPTION OF THE PREFERRED EMBODIMENTS

The improved structure of the air damper according to an embodiment was conceived to efficiently regulating the opening and closing motion of a box or a lid, while preventing the dust from entering the cylinder of the air damper during the operation of the air damper. Such an air damper is used in, for example, the glove box of an automobile.

Figure 1:
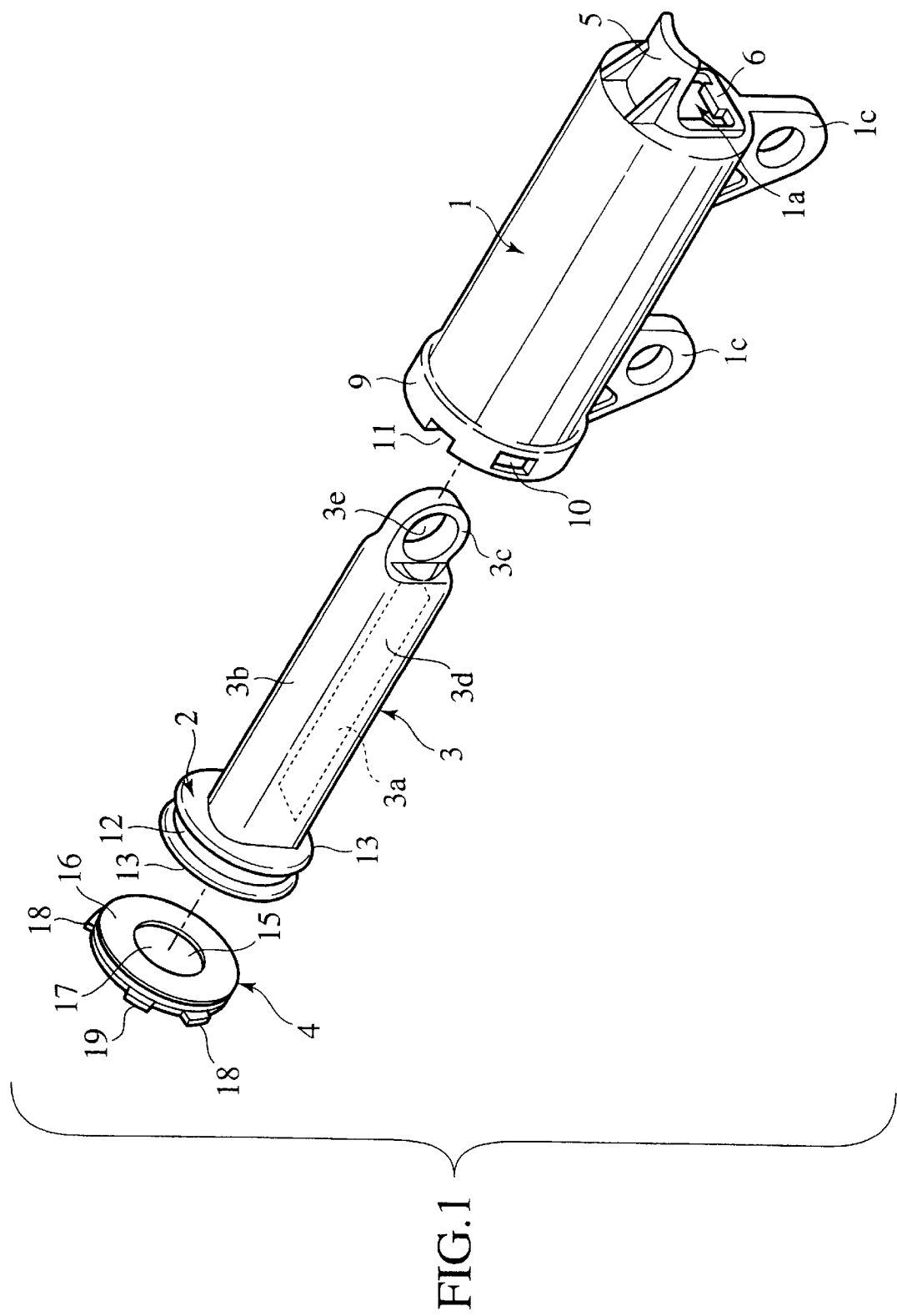
FIG. 1 is an exploded perspective view of an air damper according to an embodiment of the invention.

As illustrated in FIG. 1, an air damper according to one embodiment includes a cylinder 1 with a first opening 1a and a second opening 1b, a piston 2 that moves in the cylinder 1 while keeping tight contact with the inner face of the cylinder 1, a piston rod 3 extending from the piston 2 and moving to and fro at the first opening 1a, and a cap 4 positioned at the second opening 1b. The cap 4 is slightly movable at the second opening 1b.

In the example of FIG. 1, the piston rod 3 has an arched top surface 3b and sidewalls 3d continuously extending from the arched top surface 3b. The cross-sectional view of the piston rod 3 is arched or inverse-U shaped with an opening 3a at the bottom, as illustrated in FIG. 3. The first opening 1a of the cylinder 1 is also arched, as is clearly illustrated in FIG. 2A. A peak 5 is furnished over the arched portion of the first opening 1a. The arched top surface 3b of the piston rod 3 slides along the peak 5 when the piston rod 3 is pulled out or inserted into the cylinder 1 during the operation of the air damper.

Figure 2A:
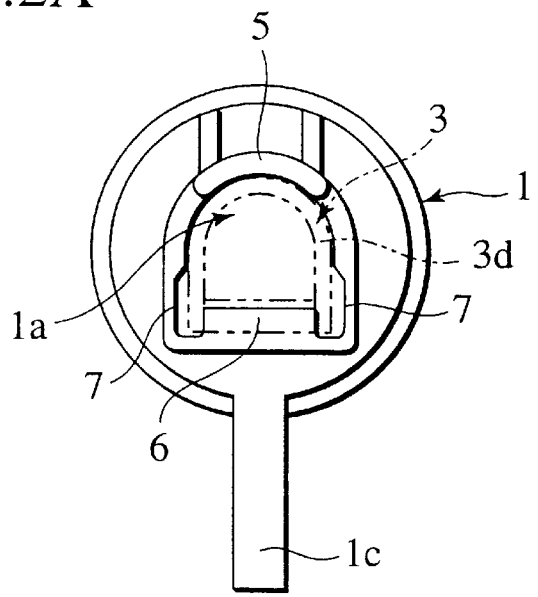
FIG. 2A is a front view of a cylinder used in the air damper shown in FIG. 1 and a cross-sectional view of a piston used in the air damper shown in FIG. 1.

FIG. 2A illustrates the cylinder 1 more clearly. A stopper 6 projects into the first opening 1a so as to be opposed to the arched edge of the first opening 1a. The stopper 6 is to be positioned between the sidewalls 3d of the piston rod 3 when the air damper is assembled, as illustrated by the ghost line in FIG. 2A.

The first opening 1a of the cylinder has enlarged portions 7 on both sides near the bottom. Accordingly, the sidewalls 3b of the piston rod 3 move in and out through the first opening 1a without conflicting with the frame of the first opening 1a.

Figure 2B:
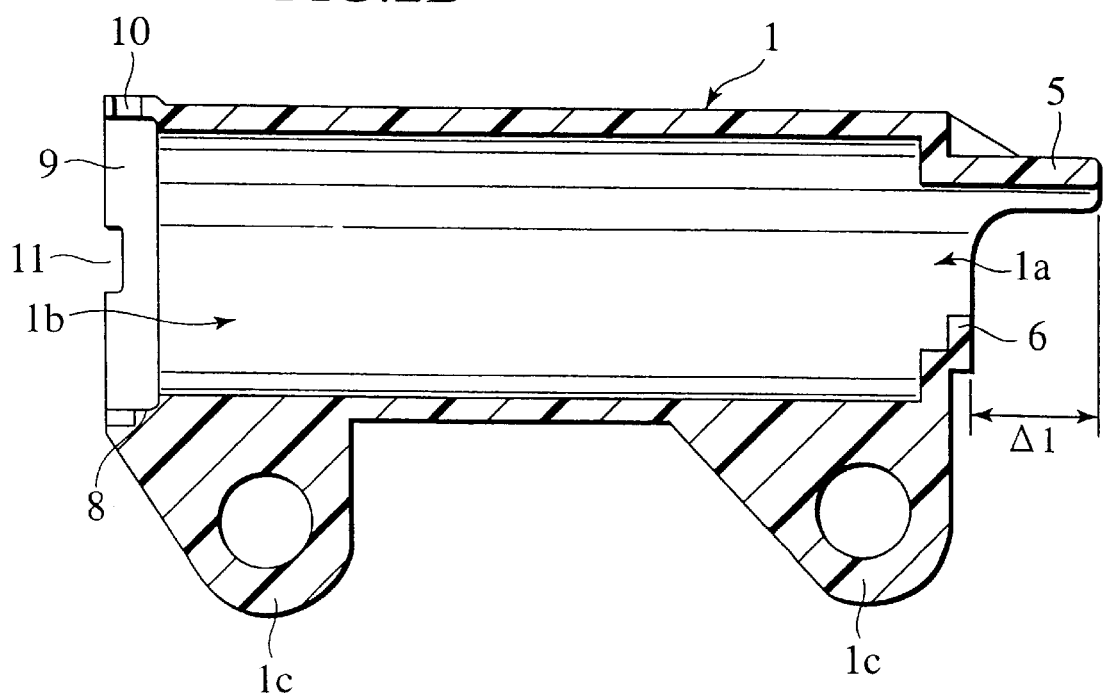
FIG. 2B is a cross-sectional side view of the cylinder.

The length of the peak 5 projects over the first opening 1a by the length of Δ1, as illustrated in FIG. 2B. Length Δ1 is set so that a hole 3e of a fixing ring 3c (FIGS. 1 and 3A) of the piston rod 3 extends beyond the peak 5 even if the piston rod 3 is completely inserted into the cylinder 1.

Since the shape of the first opening 1a and the contour of the piston rod 3 are similar, the stable motion of the piston rod 3 is guaranteed. In addition, the enlarged portions 7 of the first opening 1a allow the piston rod 3 to move smoothly without touching the entire periphery of the first opening 1a. Accordingly, the sliding resistance of the piston rod 3 is reduced.

An annular platform 8 is formed in the inner face of the cylinder 1 near the second opening 1b. The annular platform 8 functions as a sealing face 8, which is to come into contact with the cap 4 when the piston rod 3 is pulled out of the cylinder 1. An outward annulus 9 is formed around the second opening 1b at the position corresponding to the annular platform 8. The diameter of the annulus 9 is slightly greater than that of the cylinder 1. Indents (or cutaways) 11 and holes 10 are formed alternately along the outward annulus 9 at a predetermined interval, as is clearly shown in FIG. 1.

The cylinder 1 has fixing fins 1c with holes. The fixing fins 1c extend from the outer face of the cylinder 1 near both ends thereof. The fixing fins 1c are used when the air damper is attached to a glove box of an automobile.

Figure 3A:
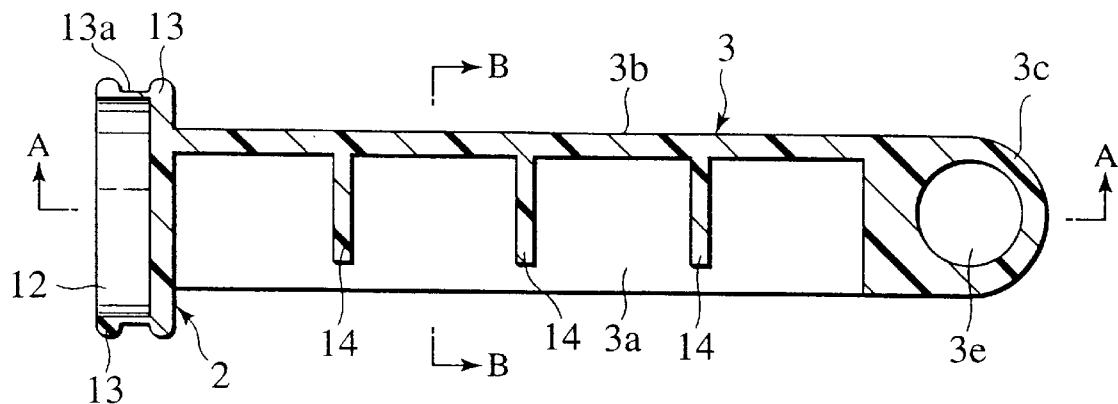
FIG. 3A is a cross-sectional side view of a piston and the piston rod extending from the piston.
Figure 3B:
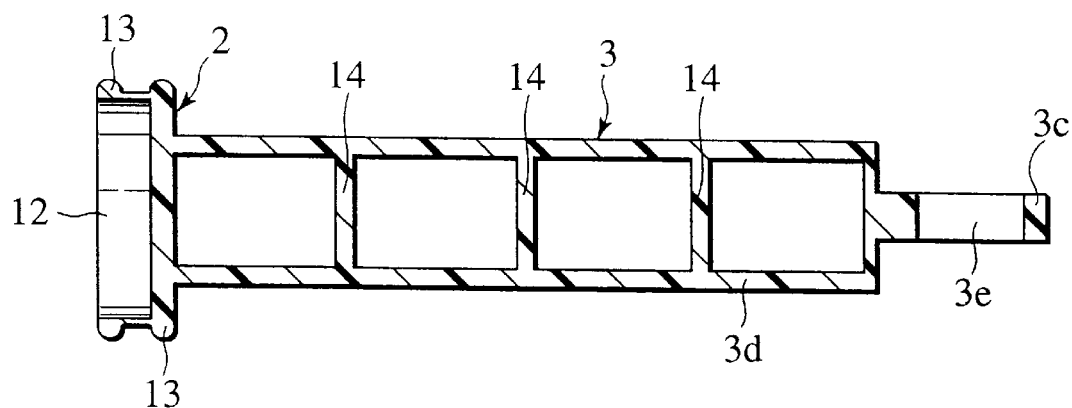
FIG. 3B is a cross-sectional view taken along the A—A line shown in FIG. 3A.
Figure 3C:
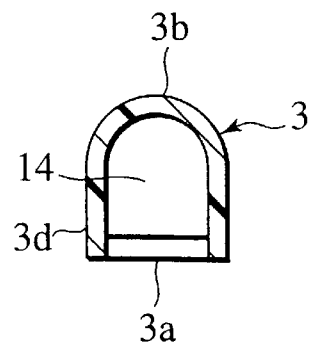
FIG. 3C is a cross-sectional view taken along the B—B line in FIG. 3A.

FIGS. 3A and 3B illustrate the piston rod 3 and the piston 2 coupled to the piston rod 3. The piston rod 3 has a fixing ring 3c at the leading end. In this embodiment, the plane defined by the fixing ring 3c is perpendicular to a plane containing the opening 3a of the piston rod 3. Preferably, the piston 2 is formed integrally with the piston rod 3. The piston 2 includes a disc 12, whose diameter is slightly smaller than the inner diameter of the cylinder 1. At least one annular bead 13 is formed around the disc 12. The annular bead 13 functions as a sealing bead 13 so that the piston 2 keeps contact with the inner face of the cylinder 1 even if the piston rod 3 moves in and out at the first opening 1a. For this reason, the diameter of the sealing bead 13 is slightly greater than the inner diameter of the cylinder 1. Preferably, the annular bead 13 is also formed integrally with the piston rod 3. In the embodiment shown in FIGS. 3A and 3B, there are two annular beads 13 formed with a groove 13a between them. The groove 13a absorbs the deformation of the annular beads 13 when the piston 2 moves in the cylinder 1.

As has already been explained above, the piston rod 3 has an arched top surface 3b and the sidewalls 3d extending downward from the top surface 3b, with an opening 3a between the sidewalls 3d. The stopper 6 positioned at the first opening 1a of the cylinder 1 is received between the sidewalls 3d of the piston rod 3 when the piston rod is assembled in the cylinder 1. Reinforcing ribs 14 extend inside the piston rod 3, and a fixing ring 3c is formed at the front end of the piston rod 3. The height of the rib 14 is set smaller than that of the piston rod 3 in order to avoid interference with the stopper 6.

The piston rod 3 and the piston 2 are made of an elastomer, and formed by, for example, molding. As has been explained, the piston rod 3 has an arched top surface 3b and sidewalls 3d (or a continuous wall) and an opening 3a. This arrangement is suitable for resin molding. That is, the weight and the material cost are reduced, while achieving sufficient resin strength. Although, in the embodiment, the piston rod 3 has an arched cross-section, the piston rod 3 is not limited to this shape. As long as the piston rod 3 has an opening 3a and a continuous outer wall, an inverse U-shape, an inverse V-shape, or a downward C-shape, or other appropriate shape may be used. In any case, the molding process of the piston rod 3 can be facilitated and the weight of the piston rod 3 is reduced. It should be noted that if the shaped of the piston rod 3 is modified, the first opening 1a of the cylinder 1 and the peak 5 are shaped in accordance with the contour of outer wall of the piston rod 3.

Figure 4:
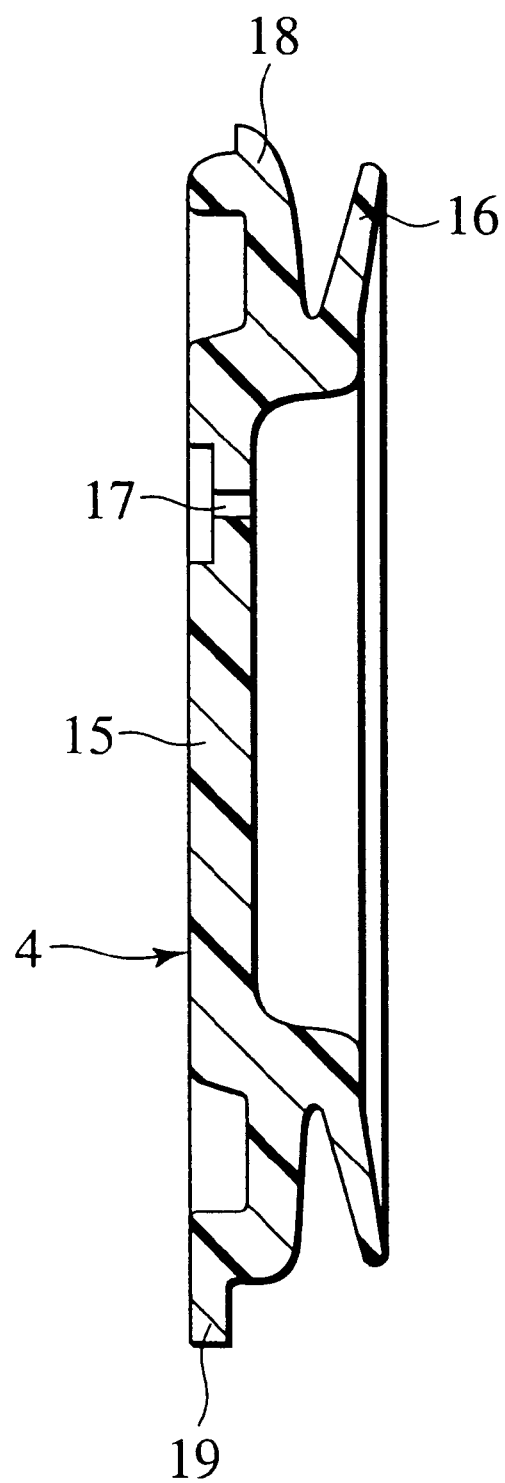
FIG. 4 is a cross-sectional view of a cap used in the air damper shown in FIG. 1.

FIG. 4 illustrates the cap 4. The cap 4 has a base disc 15 and a flange 16 extending outward in a radial direction from the base disc 15. The base disc 15 is to be fit into the outward annulus 9 formed at the second opening 1b of the cylinder 1 in such a manner that the base disc 15 is slightly movable in the axial direction of the cylinder 1. An orifice 17 is formed near the center of the base disc 15. As is clearly shown in FIGS. 1 and 4, projections 18 and positioning pieces 19 are formed along the circumference of the base disc 15 at a predetermined interval. When the cap 4 is fit into the second opening 1b of the cylinder 1, the projections 18 are fit into the holes 10 of the outward annulus 9, and positioning pieces 19 come into engagement with the indents 11. The holes 10 and the indents 11 are also formed at a predetermined interval along the outward annulus 9. If the piston rod 3 is pulled out of or inserted into the cylinder 1 (which means that the glove box is opened or closed), the flange 16 of the cap 4 comes into contact with or separates from the annular platform 8 of the cylinder 1 due to a pressure change in the cylinder 1.

Figure 5:
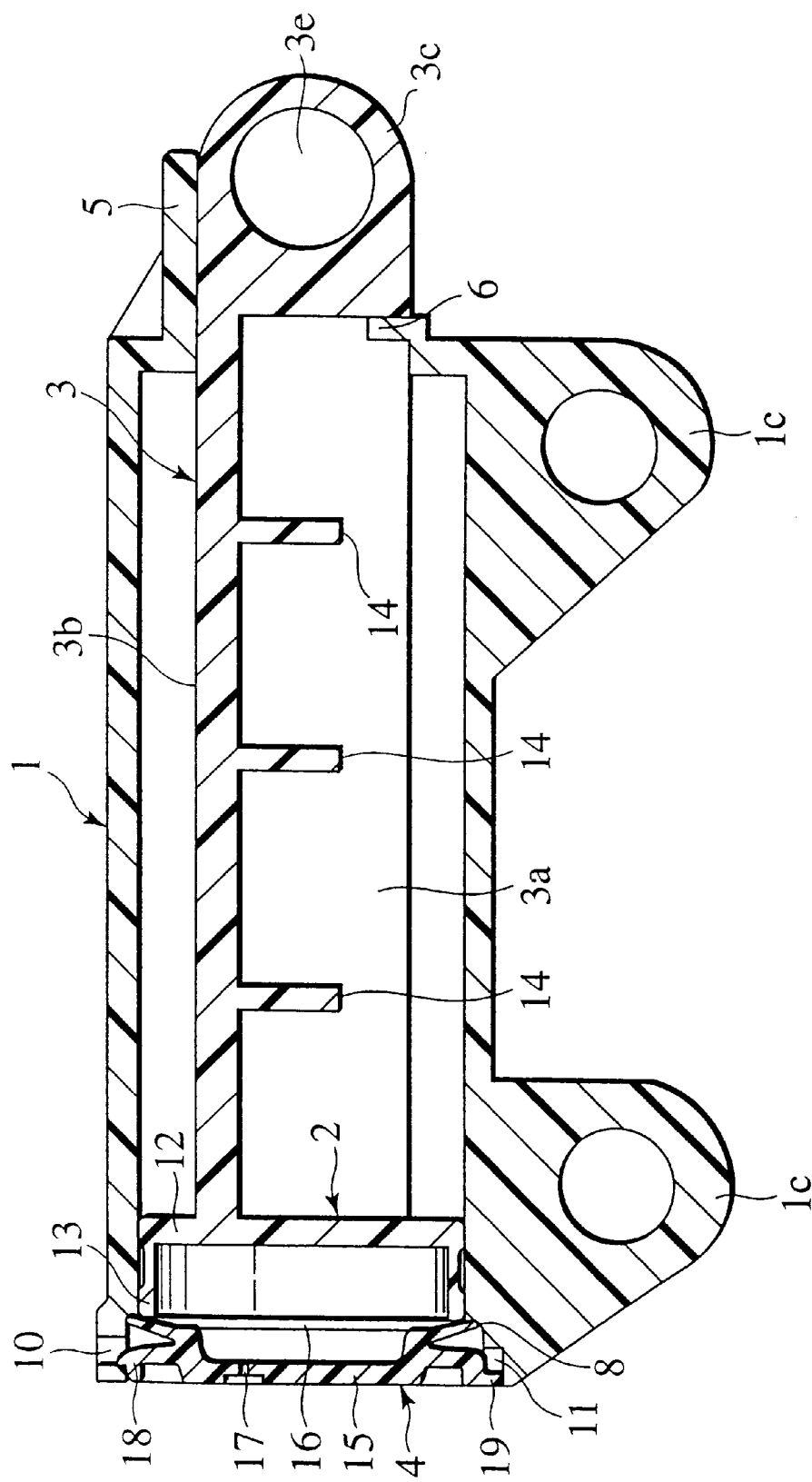
FIG. 5 is a cross-sectional view of the assembled air damper shown in FIG. 1.

When assembling the air damper, the piston rod 3 and the piston 2 are inserted into the cylinder 1 from the second opening 1b. Since the piston rod 3 is made of an elastomer, the fixing ring 3c and the front face of the piston rod 3, from which the fixing rig 3c extends, deform and easily get over the stopper 6. At this time, the stopper 6 also slightly deforms. Then, the cap 4 is fit into the outward annulus 9 so that the positioning pieces 19 are received in the indents 11. The cap 4 is further pushed into the outward annulus 9 until the projections 18 of the cap 4 are fit into the holes 10. Thus, the one-way type air damper can be easily assembled, as illustrated in FIG. 5.

To install this air damper in the glove box of an automobile, the cylinder 1 is fixed to the instrument panel of the automobile in a pivotable manner using one of the fixing fins 1c (e.g., using the fixing fin 1c located near the opening 1b), and the piston rod 3 is fixed to the glove box via the fixing ring 3c. Alternatively, the fixing ring 3c may be fixed to the instrument panel, and the fixing fin 1c of the cylinder 1 may be fixed to the glove box. In either case, the air damper is installed so that the arched top surface 3b of the piston rod 3 is kept upward with the opening 3a facing downward to prevent dust from accumulating in the piston rod 3.

Figure 6:
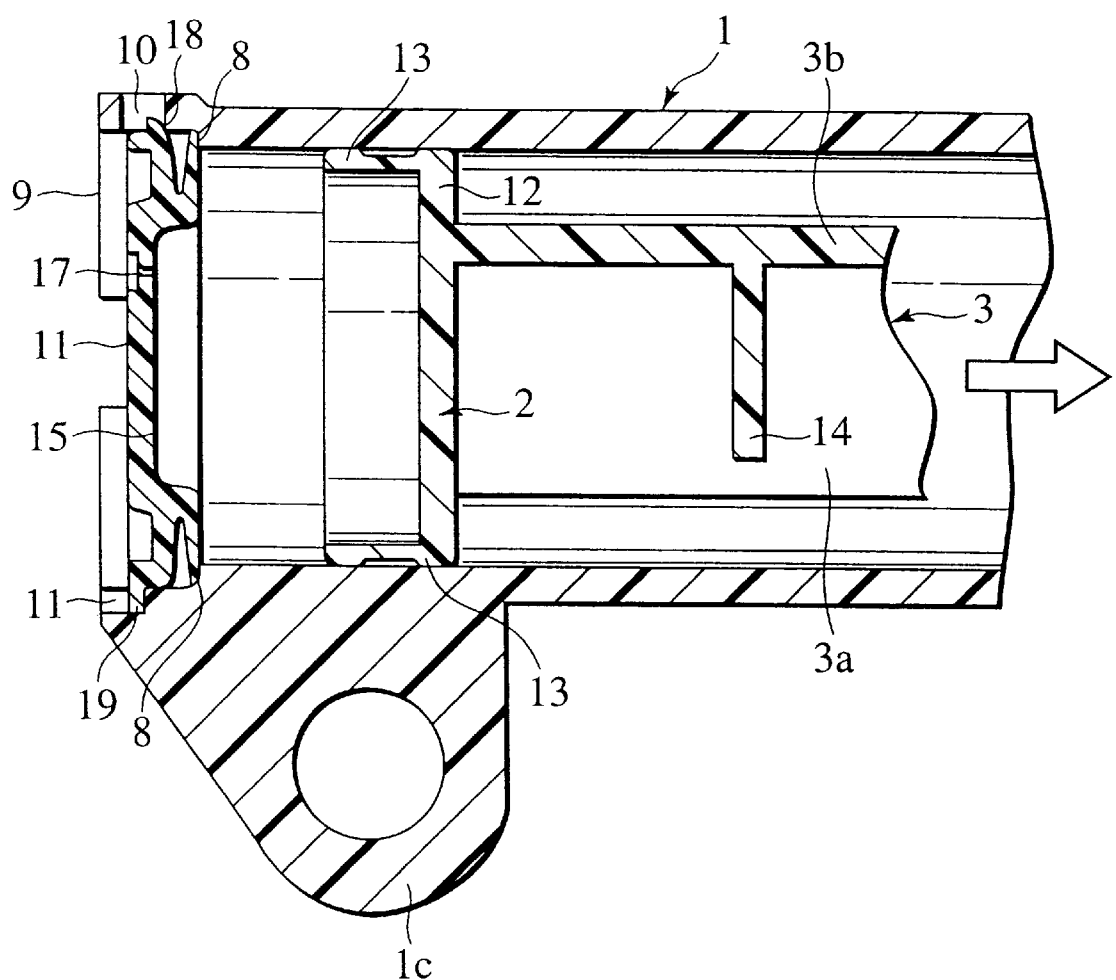
FIG. 6 is a cross-sectional view of a part of the air damper, which illustrates how a damper effect is achieved when the piston rod is pulled out of the cylinder.

When the glove box is opened, the piston rod 3 is pulled out of the cylinder 1 via the first opening 1a, and accordingly, the piston 2 moves in the cylinder 1 toward the first opening 1a, as illustrated in FIG. 6. As the piston 2 moves toward the first opening 1a, the pressure in the space between the cap 4 and the piston 2 lowers. Accordingly, the base disc 15 of the cap 4 is sucked into the cylinder 1 until the projections 18 abut against the edges of the holes 10 of the outward annulus 9 of the cylinder 1. In this state, the seal flange 16 of the cap 4 comes into contact with the sealing face (i.e., the annular platform) 8 of the cylinder 1. Accordingly, the orifice 17 becomes the only air passage through which the air can flow into the cylinder 1. This limited airflow produces a damper effect, and the glove box opens gently.

As has been explained above, as the glove box opens, the piston rod 3 is pulled out of the cylinder 1, with the arched top surface 3b being guided by the peak 5. This arrangement guarantees the stable motion of the piston rod 3. The peak 5 protects the piston rod 3 from undesirable load or breakage, by making use of the leverage, even if the piston rod 3 is fully pulled out. In addition, since the opening 3a of the piston rod 3 faces downward dust is prevented from entering the cylinder 1 during the operation of the air damper.

The enlarged portions 7 formed on both sides of the opening 1a of the cylinder 1 allow the piston rod 3 to move smoothly without conflicting with the side edges of the opening 1a. This arrangement reduces the resistance between the opening 1a and the piston rod 3 during the operation of the air damper, while guaranteeing the rigidity for supporting the piston rod 3. In addition, when molding the piston rod 3, high precision is generally given to the arched top surface 3b, whereas not so much attention is paid to the straight sidewalls 3d. Accordingly, forming a gap between the opening 1a and the sidewalls 3d of the piston rod 3 is rational.

Figure 7:
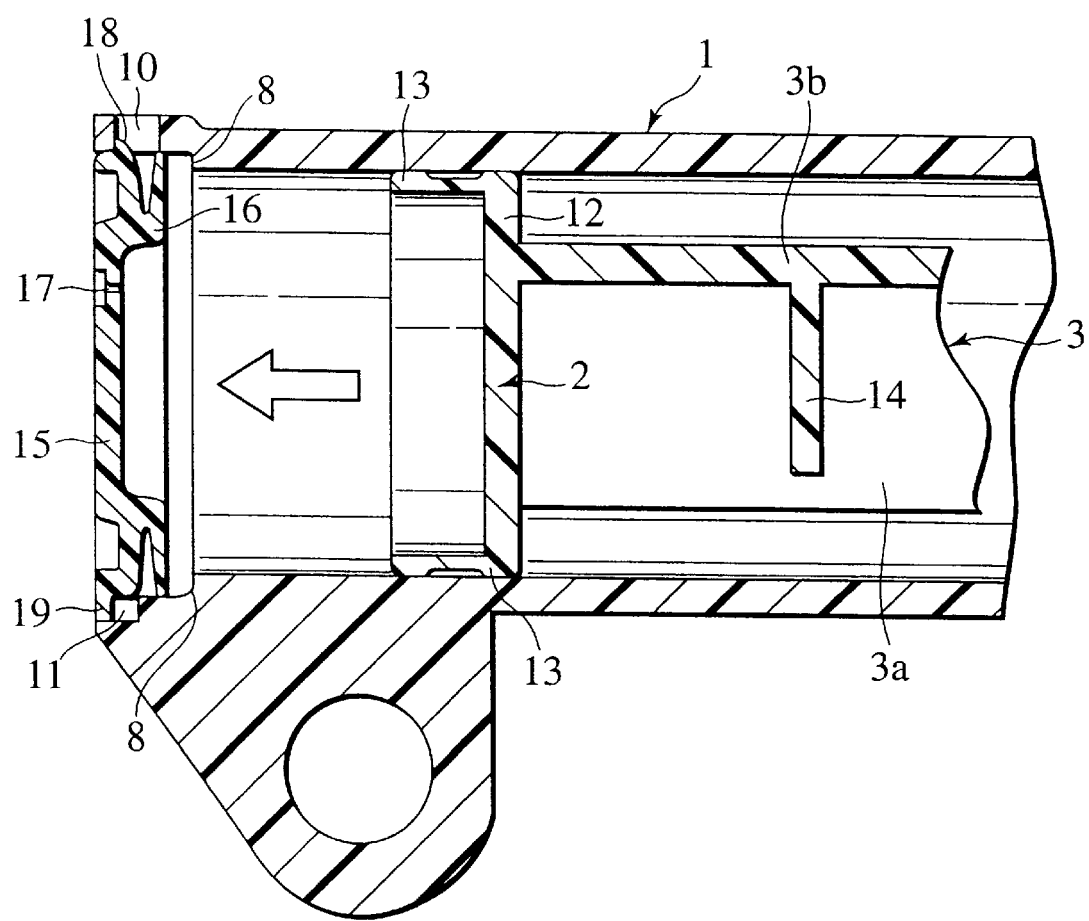
FIG. 7 illustrates how the air is released from the cylinder when the piston rod is pushed into the cylinder.

When closing the glove box, the piston rod 3 is gradually pushed into the cylinder 1. The piston 2 moves toward the second opening 1b of the cylinder 1, and the pressure in the cylinder 1 increases. This pressure change causes the base disc 15 of the cap 4 to move away from the cylinder 1 until the projections 18 abut against the opposite edges of the holes 10. The flange 16 of the cap 4 separates from the annular platform (i.e., the sealing face) 8 and the air escapes from the cylinder 1 as shown in FIG. 7. Consequently, the piston rod 3 returns to the initial position without much air resistance, and the glove box is closed smoothly.

Figure 8:
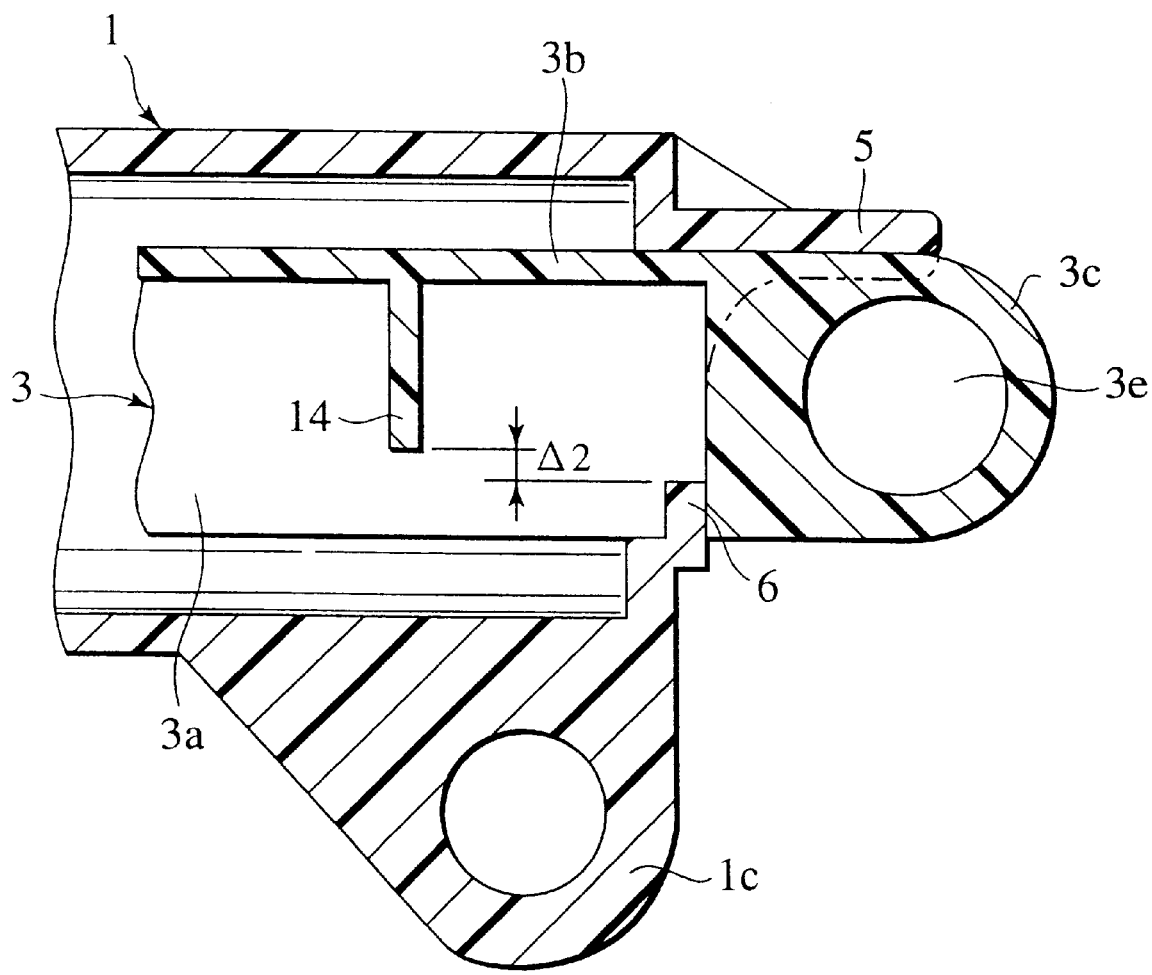
FIG. 8 illustrates how the position of the piston rod is restricted when the piston rod is completely inserted in the cylinder.

Because the stopper 6 is formed at the lower edge of the first opening 1a of the cylinder 1, the front end face of the piston rod 3, from which the fixing ring 3c extends, strikes the stopper 6 when the piston rod 3 is fully pushed into the cylinder 1, as illustrated in FIG. 8. In other words, the stopper 6 regulates the initial position (i.e., the fully-inserted position) of the piston rod 3. This arrangement prevents the cap 4 from coming off the second opening 1b of the cylinder 1. The height of the reinforcing rib 14 of the piston rod 3 is set smaller than that of the piston rod 3, so that a gap $\Delta 2$ is maintained between the lower end of the reinforcing rib 14 and the top end of the stopper 6. Consequently, the piston rod 3 is inserted into the cylinder 1 without interference between the rib 14 and the stopper 6.

Shaping the piston rod 3 into an arch with a continuous outer wall 3d, leaving an opening 3a at the bottom, improves the rigidity of the piston rod 3 itself, as compared with the conventional cross-shaped piston rod. The reinforcing ribs 14 extending inside the piston rod 3 further strengthen the rigidity, and give sufficient resistance against the bending stress or the torsional stress. Shaping the piston rod 3 into the arched shell has the additional advantage that the weight and the manufacturing cost are reduced, while improving the productivity and the appearance of the piston rod 3.

Since the piston rod 3 is attached to the glove box with the opening 3a facing downward to prevent the dust from entering the cylinder 1, the cylinder 1, the piston rod 3, and the piston 2 are protected from undesirable abrasion or damage even if the glove box is frequently opened and closed. By preventing the frictional abrasion or damage, the sealing effect between piston 2 and the cylinder 1 can be maintained.

Figure 9:
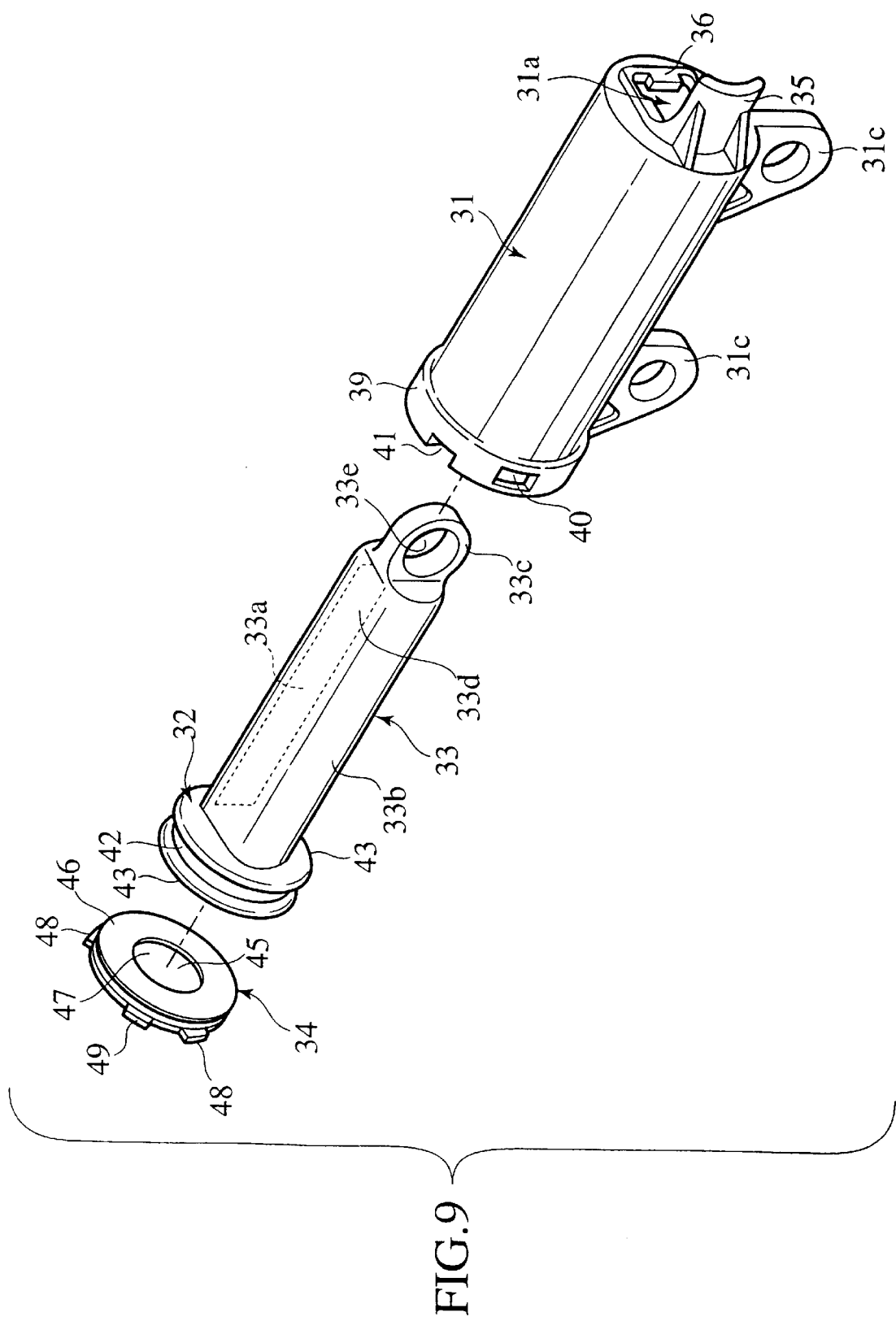
FIG. 9 is an exploded perspective view of an air damper according to another embodiment of the invention.

FIG. 9 illustrates an air damper according to another embodiment in an exploded perspective view. In this example, the shell of a piston rod 33 is rotated by 90 degrees with respect to a fixing ring 33c. Similarly, an opening 31a of a cylinder 31 is also rotated about the center axis of the cylinder 31.

The piston rod 33 has a continuous outer wall, comprising an arched face 33b and sidewalls 33d that extending from the arched face 33b, and an opening 33a extending along the longitudinal axis of the piston rod 33. In this embodiment, the piston rod 33 is sideways with respect to the fixing ring 33c. In other words, a plane containing the opening of the piston rod 33 is parallel to the plane defined by the fixing ring 33c.

Figure 10:
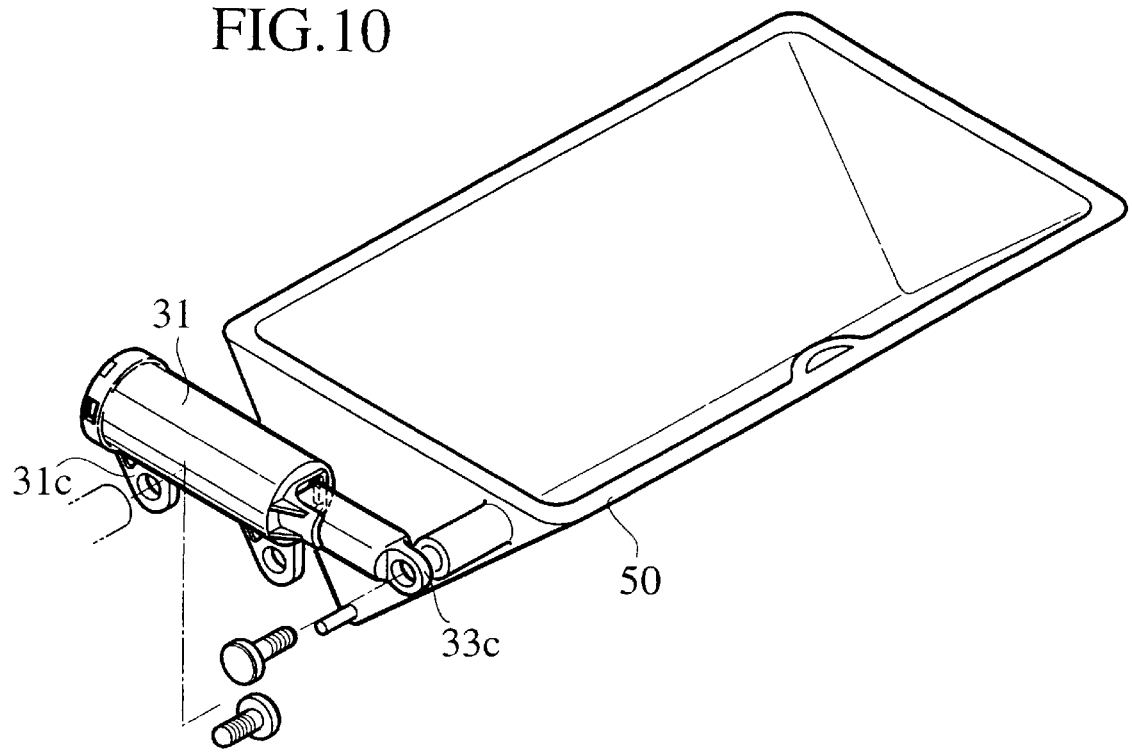
FIG. 10 illustrates the air damper shown in FIG. 9 attached to a glove box of an automobile.
Figure 11A:
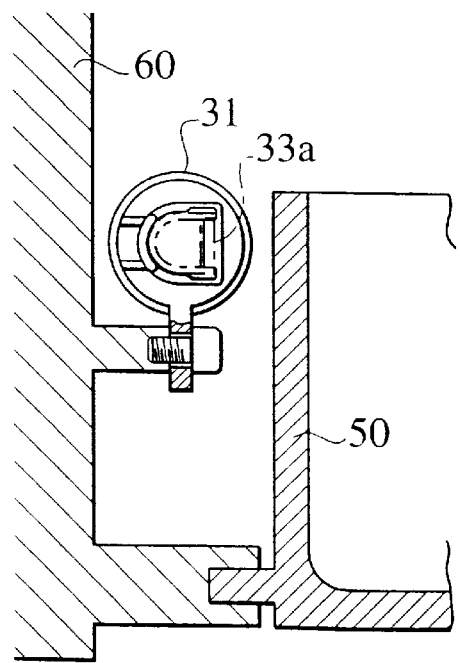
FIG. 11A is a cross-sectional front view of the air damper, in which the opening of the piston rod faces the side of the glove box.

The air damper shown in FIG. 9 is installed in the automobile so that the opening 33a of the piston rod 33 faces the side of a glove box 50, as illustrated in FIG. 10 and FIG. 11A. In this example, the fixing ring 33c of the piston rod 33 is fixed to a side of the glove box 50, and a fixing fin 31c of the cylinder 31 is fixed to an instrument panel 60 of the automobile. The opening 33a of the piston rod 33 faces the side of the glove box 50 at a very close position. This arrangement can prevent dust from accumulating in the piston rod 3 more efficiently than that of the previous embodiment. When the glove box 50 is opened and the piston rod 33 is pulled out of the cylinder 31, only the smooth surface of the continuous outer wall of the piston rod 33 appears. Unlike the previous embodiment, the opening 33a and the ribs extending inside the piston rod 33 are hidden behind the outer wall. Thus, the appearance of the air damper in actual use is improved.

Figure 11B:
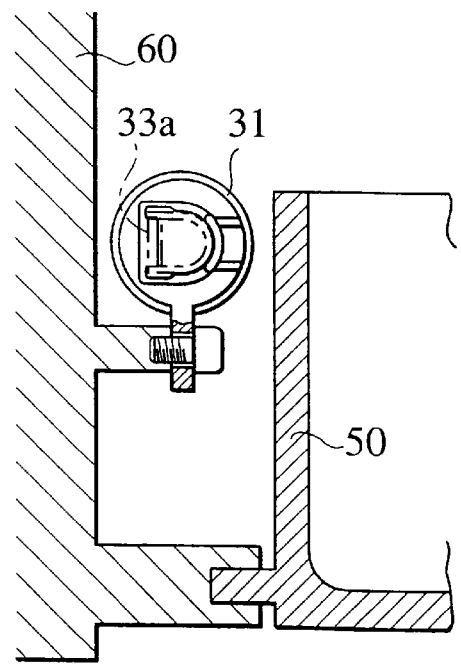
FIG. 11B is a cross-sectional front view of the air damper, in which the opening of the piston rod faces the instrument panel.

In an alternative example, the air damper may be attached to the glove box 50 so that the opening 33a of the piston rod 33 faces the instrument panel 60 at a close position, as illustrated in FIG. 11B. In the example shown in FIG. 11, the cylinder 31 is fixed to the instrument panel 60 via the fixing fix 31c, and the piston rod 33 is fixed to the glove box 50 via the fixing ring 33c. However, the piston rod 33 may be fixed to the instrument panel 60 and the cylinder 31 may be fixed to the glove box 50.

Although the present invention has been described based on specific embodiments, the invention will not be limited to these examples. It should be appreciated that there are many modifications and substitutions without departing from the scope of the invention. For example, although, in the previous embodiment, the piston rod 3 is positioned so that the opening 3a faces downward during the operation of the air damper, the opening 3a may be positioned at any angle lower than the horizontal line. The air damper may be used with any article that consists of a fixed body and a movable body. The air damper of the invention is suitably used to control the motion of the movable body relative to the fixed body.

What is claimed is:

1. An air damper comprising:
   a cylinder having a first opening and a second opening;
   a piston that moves in the cylinder;
   a piston rod coupled to the piston and moving in and out at the first opening of the cylinder; the piston rod having a continuous outer wall and an opening extending along the longitudinal axis of the rod; and
   a cap positioned at the second opening of the cylinder.

2. The air damper of claim 1, wherein the first opening is shaped so as to be similar to a contour of the continuous outer wall of the piston rod.

3. The air damper of claim 2, wherein the first opening has a peak for guiding a part of the outer wall of the piston rod.

4. The air damper of claim 1, wherein the piston rod has an inverse U-shaped cross-sectional view taken along a plane perpendicular to the longitudinal axis.

5. The air damper of claim 1, wherein the piston rod has a C-shaped cross-sectional view taken along a plane perpendicular to the longitudinal axis.

6. The air damper of claim 1, wherein the piston rod has an inverse V-shaped cross-sectional view taken along a plane perpendicular to the longitudinal axis.

7. The air damper of claim 1, wherein the piston rod has a fixing ring at a leading end.

8. The air damper of claim 7, wherein a plane containing the opening of the piston rod is perpendicular to a plane defined by the fixing ring.

9. The air damper of claim 7, wherein a plane containing the opening of the piston rod is parallel to a plane defined by the fixing ring.

10. The air damper of claim 1, wherein the piston rod has a reinforcing rib inside the outer wall.

11. An air damper used to control a motion of a movable body relative to a fixed body, the air damper comprising:
    a cylinder having a first opening and a second opening;
    a piston that moves in the cylinder;
    a piston rod coupled to the piston and moving in and out at the first opening of the cylinder, the piston rod having a continuous outer wall and an opening extending along the longitudinal axis of the rod, and the piston rod being fixed to either the movable body or the fixed body with the opening facing downward; and
    a cap positioned at the second opening of the cylinder.

12. An air damper used to control a motion of a movable body relative to a fixed body, the air damper comprising:
    a cylinder having a first opening and a second opening;
    a piston that moves in the cylinder;
    a piston rod coupled to the piston and moving in and out at the first opening of the cylinder, the piston rod having a continuous outer wall and an opening extending along the longitudinal axis of the rod, and the piston rod being fixed to the movable body so that the opening faces the movable body; and
    a cap positioned at the second opening of the cylinder.

13. An air damper used to control a motion of a movable body relative to a fixed body, the air damper comprising:
    a cylinder having a first opening and a second opening;
    a piston that moves in the cylinder;
    a piston rod coupled to the piston and moving in and out at the first opening of the cylinder, the piston rod having a continuous outer wall and an opening extending along the longitudinal axis of the rod, and the piston rod being fixed to the fixed body so that the opening faces the fixed body; and
    a cap positioned at the second opening of the cylinder.

* * * * *